United States Patent
Hung

(10) Patent No.: US 11,552,562 B1
(45) Date of Patent: Jan. 10, 2023

(54) BOOST CONVERTING APPARATUS WITH PASSIVE LOSSLESS SNUBBER

(71) Applicant: ASIAN POWER DEVICES INC., Taoyuan (TW)

(72) Inventor: Tsung-Liang Hung, Taoyuan (TW)

(73) Assignee: ASIAN POWER DEVICES INC., Taoyuan (TW)

( * ) Notice: Subject to any disclaimer, the term of this patent is extended or adjusted under 35 U.S.C. 154(b) by 0 days.

(21) Appl. No.: 17/497,913

(22) Filed: Oct. 9, 2021

(30) Foreign Application Priority Data

Aug. 19, 2021 (TW) .................................. 110130664

(51) Int. Cl.
*H02M 3/155* (2006.01)
*H02M 1/34* (2007.01)
(52) U.S. Cl.
CPC ........... *H02M 3/155* (2013.01); *H02M 1/346* (2021.05)
(58) Field of Classification Search
CPC .............................. H02M 1/346; H02M 3/155
See application file for complete search history.

(56) References Cited

U.S. PATENT DOCUMENTS 6,115,273 A * 9/2000 Geissler ............... B23K 9/1056
363/89
2021/0242659 A1 8/2021 Huang et al.

FOREIGN PATENT DOCUMENTS

TW 434990 B 5/2001
TW 201130211 A 9/2011

OTHER PUBLICATIONS

Office Action dated Apr. 6, 2022 of the corresponding Taiwan patent application No. 110130664.

* cited by examiner

*Primary Examiner* — Jue Zhang
(74) *Attorney, Agent, or Firm* — Chun-Ming Shih; HDLS IPR Services

(57) ABSTRACT

A boost converting apparatus includes a boost converter and a passive lossless snubber, wherein the passive lossless snubber includes an input-end unidirectional conduction component, a resonant inductor, a resonant capacitor, and an output-end unidirectional conduction component. The present disclosure can solve the problems that the energy conversion efficiency of the hard-switching boost converter is poor and the structure of the soft-switching boost converter is complicated.

7 Claims, 7 Drawing Sheets

BOOST CONVERTING APPARATUS WITH PASSIVE LOSSLESS SNUBBER

BACKGROUND OF THE DISCLOSURE

Technical Field

The present disclosure relates to a boost converting apparatus with a snubber, and especially relates to a boost converting apparatus with a passive lossless snubber.

Description of Related Art

The related art hard-switching boost converter will produce a significant overlap area of the voltage and current on the voltage and current waveforms when switching, and this overlap area of the voltage and current is the switching loss of the switch, wherein this switching loss will reduce the energy conversion efficiency and increase the temperature of the component.

Afterwards, the related art soft-switching boost converter is provided, so that the overlap area of the voltage and current on the voltage and current waveforms mentioned above can be reduced, thereby reducing the energy loss. The related art soft-switching boost converter reduces the switching loss by reducing the rising slope or the falling slope of the switch voltage or the switch current. However, the disadvantages of the related art soft-switching boost converter are the excessive number of components and the complicated structure.

In summary, the energy conversion efficiency of the related art hard-switching boost converter is not good while the structure of the related art soft-switching boost converter is complicated.

SUMMARY OF THE DISCLOSURE

In order to solve the above-mentioned problems, an object of the present disclosure is to provide a boost converting apparatus with a passive lossless snubber.

In order to achieve the object of the present disclosure mentioned above, the boost converting apparatus of the present disclosure includes a boost converter and a passive lossless snubber electrically connected to the boost converter, wherein the passive lossless snubber includes an input-end unidirectional conduction component electrically connected to the boost converter, a resonant inductor electrically connected to the input-end unidirectional conduction component, a resonant capacitor electrically connected to the boost converter and the resonant inductor, and an output-end unidirectional conduction component electrically connected to the boost converter, the resonant inductor and the resonant capacitor.

Moreover, in an embodiment of the boost converting apparatus of the present disclosure mentioned above, the boost converter includes a first inductor electrically connected to the input-end unidirectional conduction component and the resonant capacitor, a first transistor switch electrically connected to the first inductor and the resonant capacitor, a switch controller electrically connected to the first transistor switch, and a first diode electrically connected to the first transistor switch, the first inductor, the resonant capacitor and the output-end unidirectional conduction component.

Moreover, in an embodiment of the boost converting apparatus of the present disclosure mentioned above, when the boost converting apparatus is configured to work in a first working state, the switch controller is configured to turn on the first transistor switch, and the first inductor is configured to be excited by an input-end voltage to store an electric energy in a magnetic field form, and a first inductor current flowing through the first inductor increases gradually, and the resonant inductor and the resonant capacitor are configured to be charged by the input-end voltage and to resonate, and then the boost converting apparatus is configured to work in a second working state.

Moreover, in an embodiment of the boost converting apparatus of the present disclosure mentioned above, when the boost converting apparatus is configured to work in the second working state, the switch controller is configured to keep turning on the first transistor switch, and the first inductor is configured to continue to be excited by the input-end voltage to store the electric energy in the magnetic field form, and the first inductor current flowing through the first inductor continues to increase, and the resonant inductor and the resonant capacitor are configured to continue to be charged by the input-end voltage and to resonate, and the input-end unidirectional conduction component is configured to make the resonant inductor and the resonant capacitor be configured to resonate for a half cycle and then stop resonating, so that a resonant capacitor voltage of the resonant capacitor is twice the input-end voltage, and so that a resonant inductor current flowing through the resonant inductor is zero, and then the boost converting apparatus is configured to work in a third working state.

Moreover, in an embodiment of the boost converting apparatus of the present disclosure mentioned above, when the boost converting apparatus is configured to work in the third working state, the switch controller is configured to turn off the first transistor switch, and a parasitic capacitor of the first transistor switch is configured to be charged by the first inductor current from zero volts, so that a drain-source voltage of the first transistor switch increases gradually, and the resonant capacitor is configured to discharge, so that the output-end unidirectional conduction component is configured to be forward-biased conducted, and the resonant capacitor voltage is discharged from twice the input-end voltage to zero volts, and the drain-source voltage of the first transistor switch plus the resonant capacitor voltage of the resonant capacitor is equal to an output-end voltage of an output end, and when the resonant capacitor voltage of the resonant capacitor is discharged to zero volts, the first diode is configured to be forward-biased conducted by the first inductor current, and then the boost converting apparatus is configured to work in a fourth working state.

Moreover, in an embodiment of the boost converting apparatus of the present disclosure mentioned above, when the boost converting apparatus is configured to work in the fourth working state, the switch controller is configured to keep turning off the first transistor switch, and the first diode is configured to continue to be forward-biased conducted by the first inductor current, and an input-end unidirectional conduction current flowing through the input-end unidirectional conduction component is zero, and the resonant inductor current flowing through the resonant inductor is zero, and a resonant capacitor current flowing through the resonant capacitor is zero, and an output-end unidirectional conduction current flowing through the output-end unidirectional conduction component is zero, and the electric energy stored in the magnetic field form by the first inductor is transmitted to the output end in a current form, and the first inductor current flowing through the first inductor decreases gradually.

Moreover, in an embodiment of the boost converting apparatus of the present disclosure mentioned above, the boost converter further includes an input-end capacitor electrically connected to the input-end unidirectional conduction component and the first inductor.

Moreover, in an embodiment of the boost converting apparatus of the present disclosure mentioned above, the boost converter further includes an output-end capacitor electrically connected to the output-end unidirectional conduction component and the first diode.

Moreover, in an embodiment of the boost converting apparatus of the present disclosure mentioned above, the input-end unidirectional conduction component is a diode; the output-end unidirectional conduction component is a diode.

Moreover, in an embodiment of the boost converting apparatus of the present disclosure mentioned above, the first transistor switch is a metal oxide semiconductor field effect transistor; the switch controller is a pulse width modulation signal controller.

The advantage of the present disclosure is to use a snubber with a simple structure to reduce the switching loss of the boost converter and to reduce the electromagnetic interference.

Please refer to the detailed descriptions and figures of the present disclosure mentioned below for further understanding the technology, method and effect of the present disclosure achieving the predetermined purposes. It believes that the purposes, characteristic and features of the present disclosure can be understood deeply and specifically. However, the figures are only for references and descriptions, but the present disclosure is not limited by the figures.

DETAILED DESCRIPTION OF THE DISCLOSURE

Figure 1:
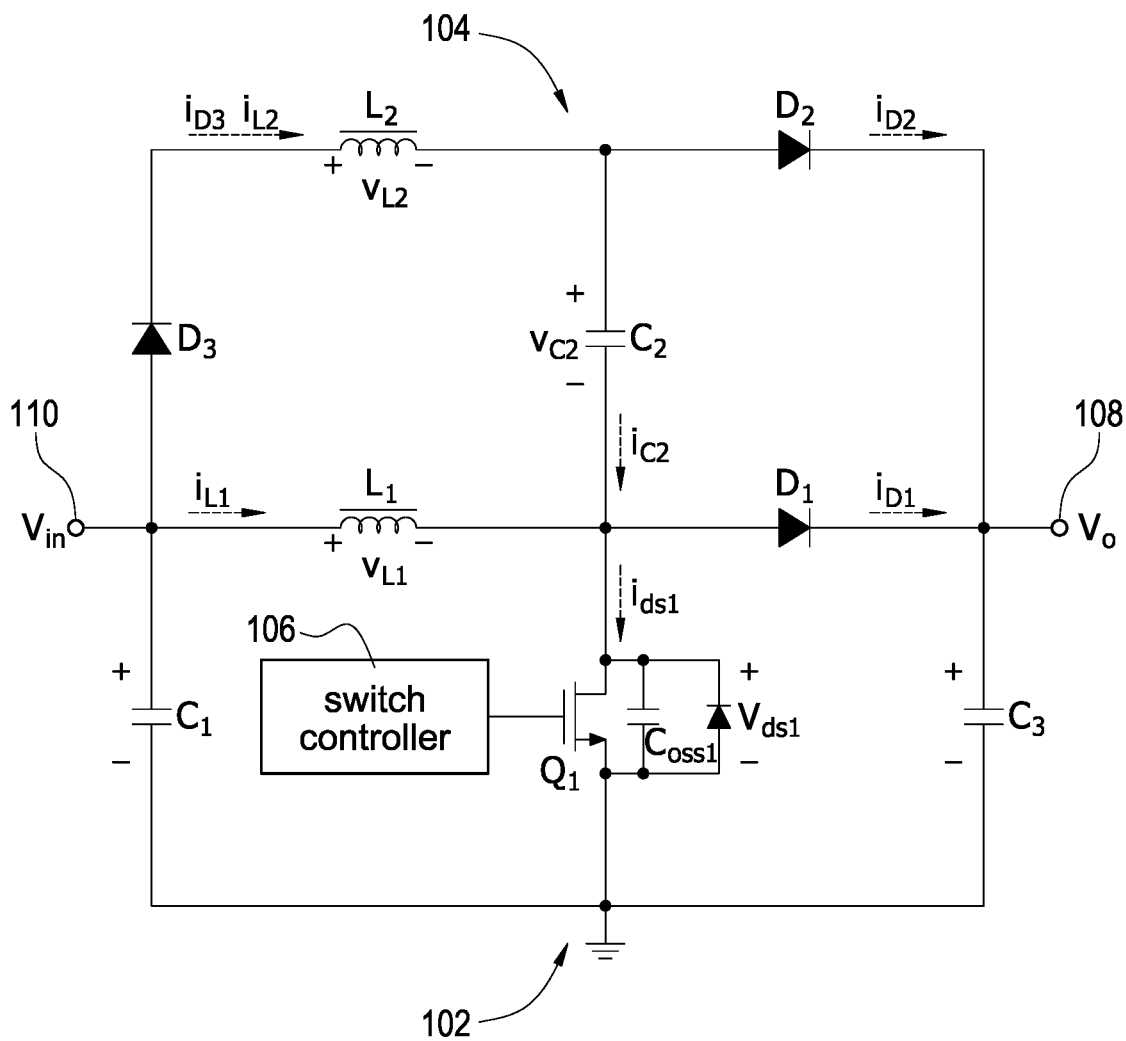
FIG. 1 shows a block diagram of an embodiment of the boost converting apparatus of the present disclosure.

In the present disclosure, numerous specific details are provided, to provide a thorough understanding of embodiments of the disclosure. Persons of ordinary skill in the art will recognize, however, that the present disclosure can be practiced without one or more of the specific details. In other instances, well-known details are not shown or described to avoid obscuring aspects of the present disclosure. Now please refer to the figures for the explanation of the technical content and the detailed description of the present disclosure:

FIG. 1 shows a block diagram of an embodiment of the boost converting apparatus of the present disclosure. A boost converting apparatus 10 of the present disclosure includes a boost converter 102 and a passive lossless snubber 104, wherein the boost converter 102 includes a first inductor $L_1$, a first transistor switch $Q_1$, a switch controller 106, a first diode $D_1$, an input-end capacitor $C_1$ and an output-end capacitor $C_3$ while the passive lossless snubber 104 includes an input-end unidirectional conduction component $D_3$, a resonant inductor $L_2$, a resonant capacitor $C_2$ and an output-end unidirectional conduction component $D_2$; the components mentioned above are electrically connected to each other. The first transistor switch $Q_1$ is, for example but not limited to, a metal oxide semiconductor field effect transistor; the switch controller 106 is, for example but not limited to, a pulse width modulation signal controller; the input-end unidirectional conduction component $D_3$ is, for example but not limited to, a diode; the output-end unidirectional conduction component $D_2$ is, for example but not limited to, a diode as well.

Figure 2:
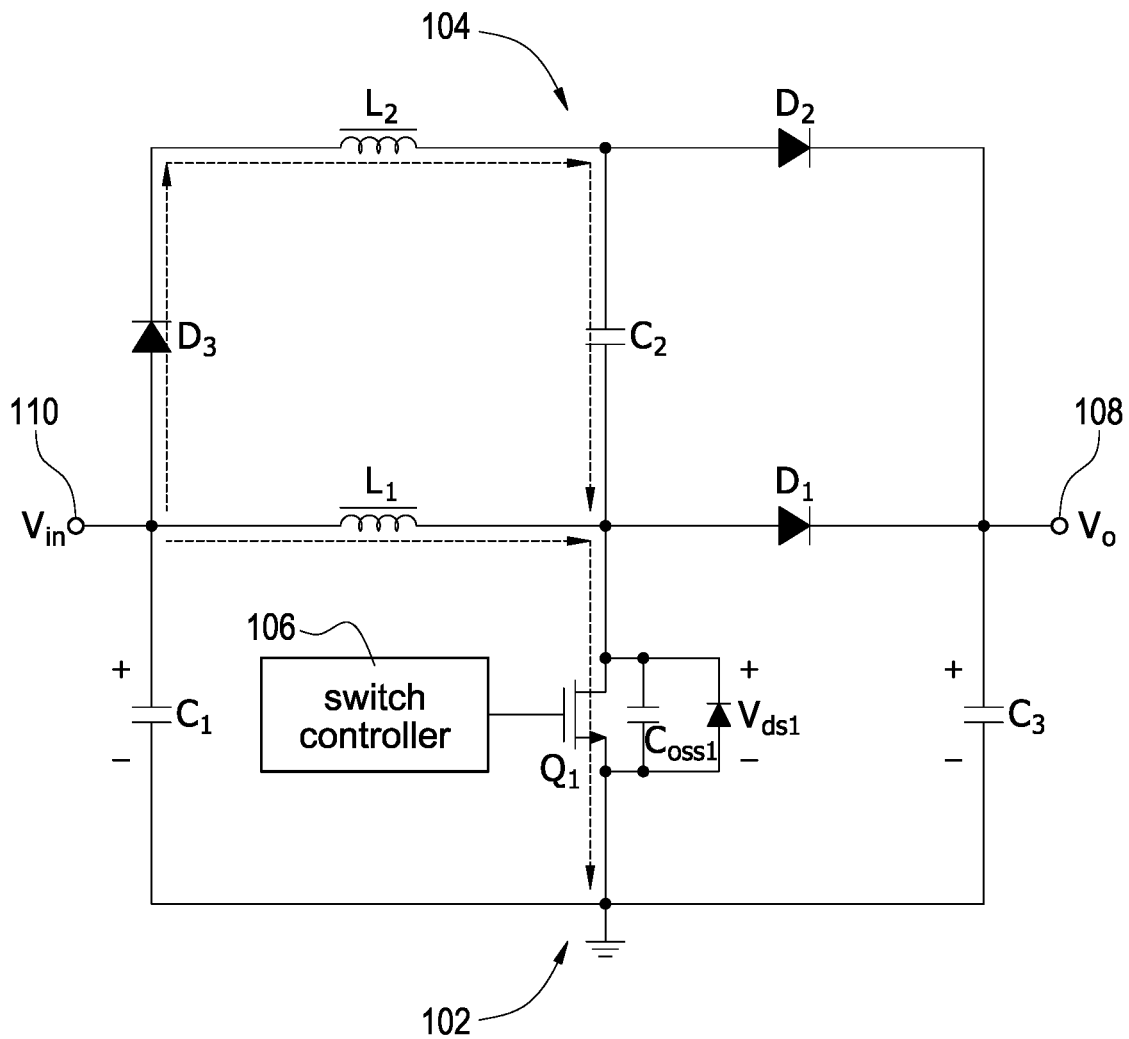
FIG. 2 shows a block diagram of the boost converting apparatus in the first working state of the present disclosure.

The boost converting apparatus 10 of the present disclosure includes four working states, which are described in details as follows:

FIG. 2 shows a block diagram of the boost converting apparatus in the first working state of the present disclosure, wherein the dashed arrows are the directions of the currents; please refer to FIG. 1 at the same time. When the boost converting apparatus 10 is configured to work in a first working state, the switch controller 106 is configured to turn on the first transistor switch $Q_1$, and the first inductor $L_1$ is configured to be excited by an input-end voltage yin to store an electric energy in a magnetic field form, and a first inductor current $i_{L1}$ flowing through the first inductor $L_1$ increases gradually, and the resonant inductor $L_2$ and the resonant capacitor $C_2$ are configured to be charged by the input-end voltage yin and to resonate, and then the boost converting apparatus 10 is configured to work in a second working state.

Figure 3:
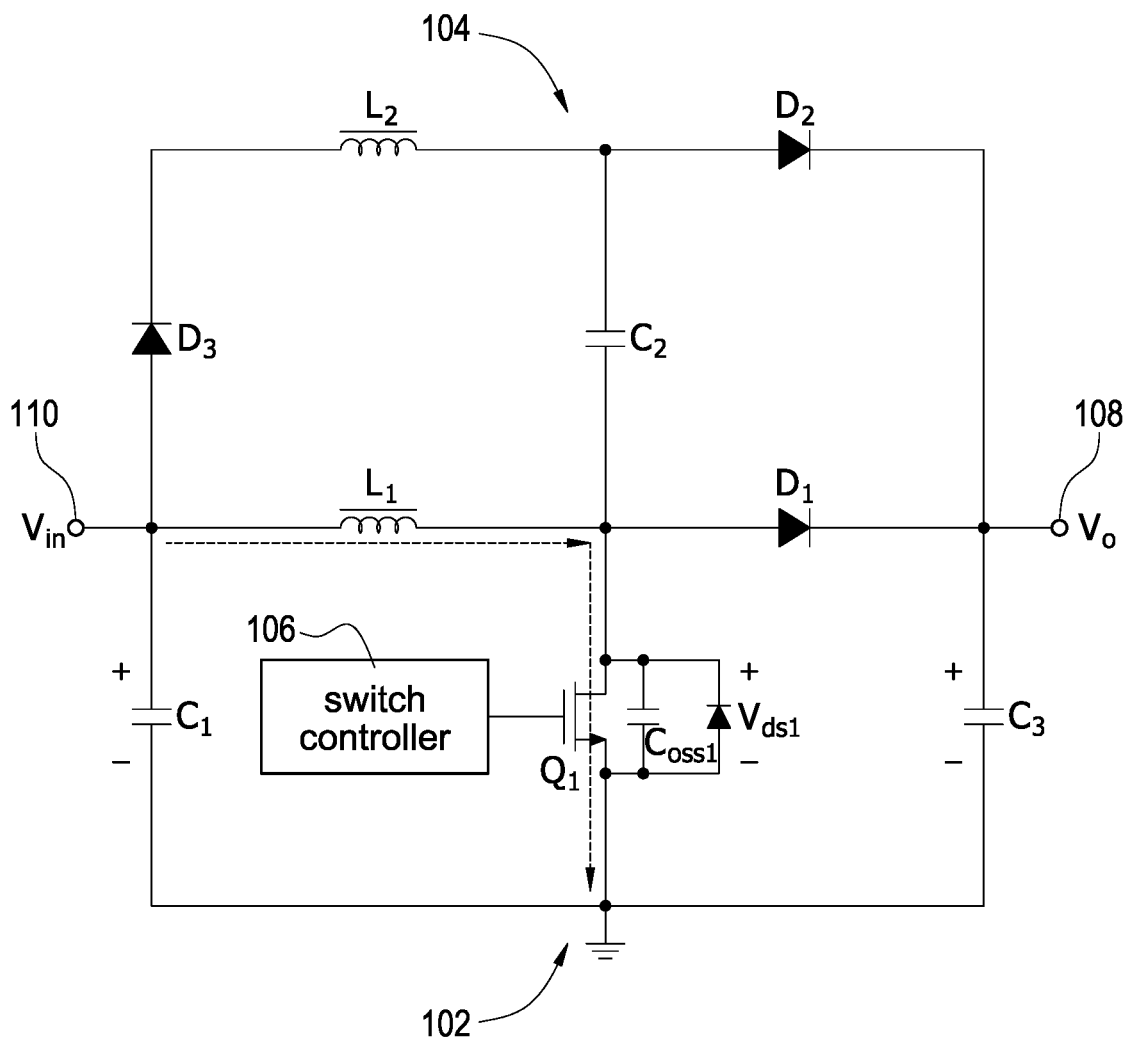
FIG. 3 shows a block diagram of the boost converting apparatus in the second working state of the present disclosure.

FIG. 3 shows a block diagram of the boost converting apparatus in the second working state of the present disclosure, wherein the dashed arrows are the directions of the currents; please refer to FIG. 1 at the same time. When the boost converting apparatus 10 is configured to work in the second working state, the switch controller 106 is configured to keep turning on the first transistor switch $Q_1$, and the first inductor $L_1$ is configured to continue to be excited by the input-end voltage $V_{in}$ to store the electric energy in the magnetic field form, and the first inductor current $i_{L1}$ flowing through the first inductor $L_1$ continues to increase, and the resonant inductor $L_2$ and the resonant capacitor $C_2$ are configured to continue to be charged by the input-end voltage yin and to resonate, and the input-end unidirectional conduction component $D_3$ is configured to make the resonant inductor $L_2$ and the resonant capacitor $C_2$ be configured to resonate for a half cycle and then stop resonating, so that a resonant capacitor voltage $v_{C2}$ of the resonant capacitor $C_2$ is twice the input-end voltage $V_{in}$, and so that a resonant inductor current $i_{L2}$ flowing through the resonant inductor $L_2$ is zero, and then the boost converting apparatus 10 is configured to work in a third working state.

Figure 4:
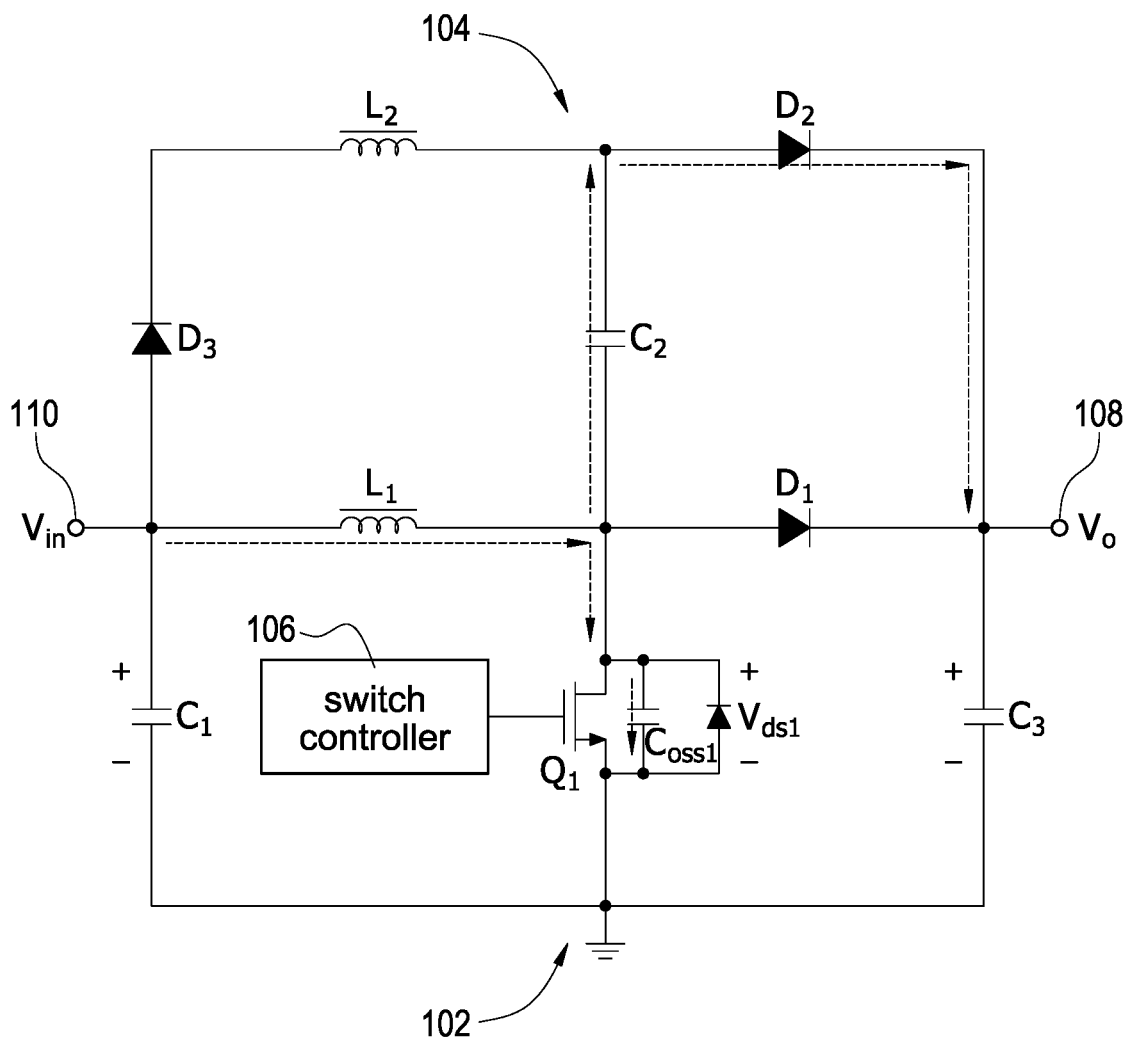
FIG. 4 shows a block diagram of the boost converting apparatus in the third working state of the present disclosure.

FIG. 4 shows a block diagram of the boost converting apparatus in the third working state of the present disclosure, wherein the dashed arrows are the directions of the currents; please refer to FIG. 1 at the same time. When the boost converting apparatus 10 is configured to work in the third working state, the switch controller 106 is configured to turn off the first transistor switch $Q_1$, and a parasitic capacitor $C_{oss1}$ of the first transistor switch $Q_1$ is configured to be charged by the first inductor current $i_{L1}$ from zero volts, so that a drain-source voltage $v_{ds1}$ of the first transistor switch $Q_1$ increases gradually, and the resonant capacitor $C_2$ is configured to discharge, so that the output-end unidirectional conduction component $D_2$ is configured to be forward-biased conducted, and the resonant capacitor voltage $v_{C2}$ is discharged from twice the input-end voltage $V_{in}$ to zero volts, and the drain-source voltage $v_{ds1}$ of the first transistor switch $Q_1$ plus the resonant capacitor voltage $v_{C2}$ of the resonant capacitor $C_2$ is equal to an output-end voltage Vo of an output end 108, and when the resonant capacitor voltage $v_{C2}$ of the resonant capacitor $C_2$ is discharged to zero volts, the first diode $D_1$ is configured to be forward-biased conducted by the first inductor current $i_{L1}$, and then the boost converting apparatus 10 is configured to work in a fourth working state.

Figure 5:
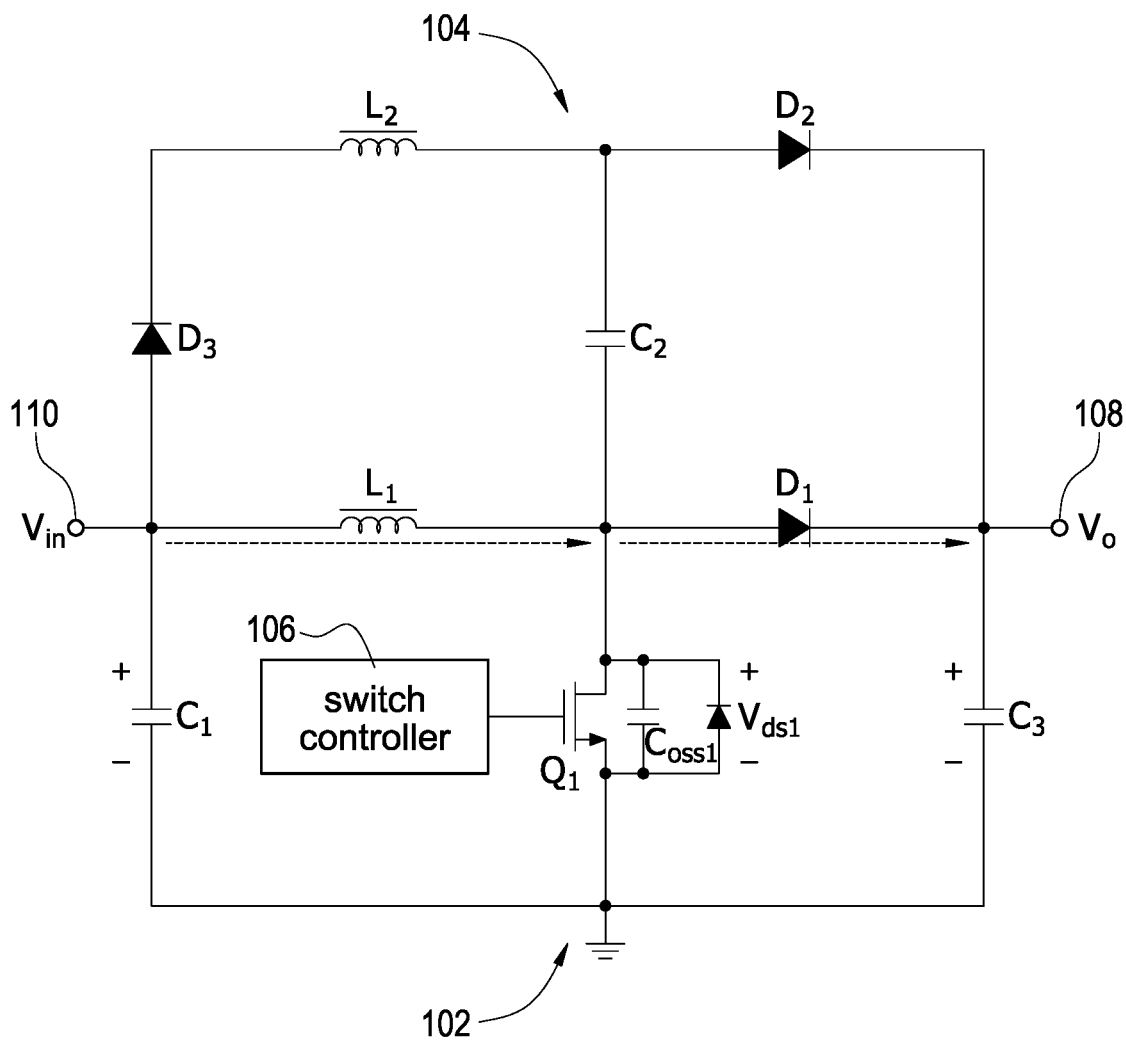
FIG. 5 shows a block diagram of the boost converting apparatus in the fourth working state of the present disclosure.

FIG. 5 shows a block diagram of the boost converting apparatus in the fourth working state of the present disclosure, wherein the dashed arrows are the directions of the currents; please refer to FIG. 1 at the same time. When the boost converting apparatus 10 is configured to work in the fourth working state, the switch controller 106 is configured to keep turning off the first transistor switch $Q_1$, and the first diode $D_1$ is configured to continue to be forward-biased conducted by the first inductor current $i_{L1}$, and an input-end unidirectional conduction current $i_{D3}$ flowing through the input-end unidirectional conduction component $D_3$ is zero, and the resonant inductor current $i_{L2}$ flowing through the resonant inductor $L_2$ is zero, and a resonant capacitor current $i_{C2}$ flowing through the resonant capacitor $C_2$ is zero, and an output-end unidirectional conduction current $i_{D2}$ flowing through the output-end unidirectional conduction component $D_2$ is zero, and the electric energy stored in the magnetic field form by the first inductor $L_1$ is transmitted to the output end 108 in a current form, and the first inductor current $i_{L1}$ flowing through the first inductor $L_1$ decreases gradually.

Figure 6:
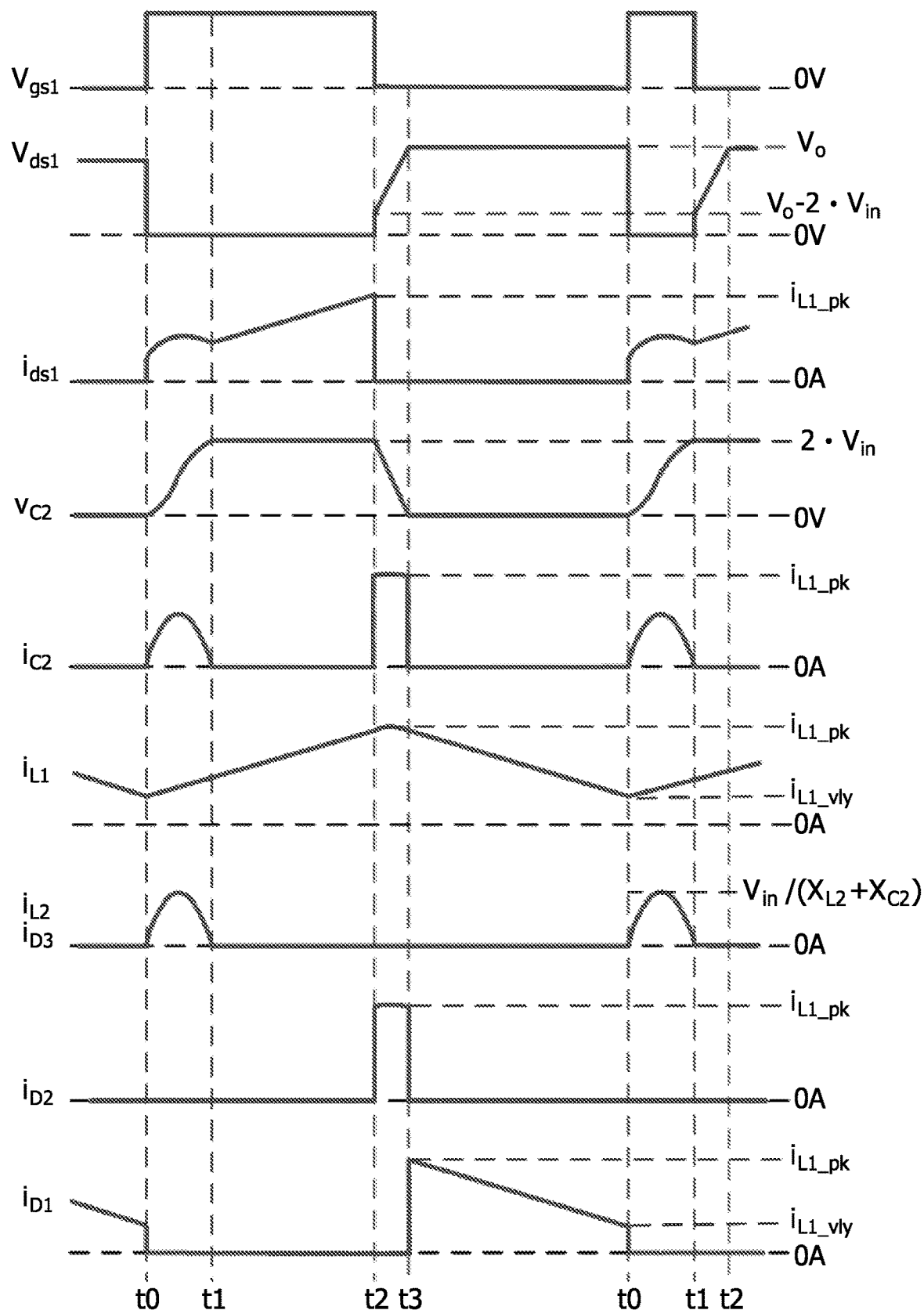
FIG. 6 shows waveform diagrams of the boost converting apparatus in the first working state to the fourth working state of the present disclosure.

FIG. 6 shows waveform diagrams of the boost converting apparatus in the first working state to the fourth working state of the present disclosure; please refer to FIG. 1 to FIG. 5 at the same time. For the ease of the explanations, the present disclosure assumes that the above-mentioned components are ideal, and the forward bias voltage of the diodes is all zero volts. Besides the above-mentioned component symbols, the first transistor switch $Q_1$ has a gate-source voltage $v_{gs1}$, a current flowing through the first diode $D_1$ is called a first diode current $i_{D1}$, a current flowing through the first transistor switch $Q_1$ is called a drain-source current $i_{ds1}$, the first inductor $L_1$ has a first inductor voltage $v_{L1}$, the resonant inductor $L_2$ has a resonant inductor current $v_{L2}$, a peak current of the first inductor current $i_{L1}$ is a first inductor peak current $i_{L1\_pk}$, a valley current of the first inductor current $i_{L1}$ is a first inductor valley current $i_{L1\_vly}$, the resonant inductor $L_2$ has a resonant inductor inductive reactance $X_{L2}$, the resonant capacitor $C_2$ has a resonant capacitor capacitive reactance $X_{C2}$, the first working state is between a zero timing point t0 and a first timing point t1, the second working state is between the first timing point t1 and a second timing point t2, the third working state is between the second timing point t2 and a third timing point t3, and the fourth working state is between the third timing point t3 and the zero timing point t0.

Figure 7:
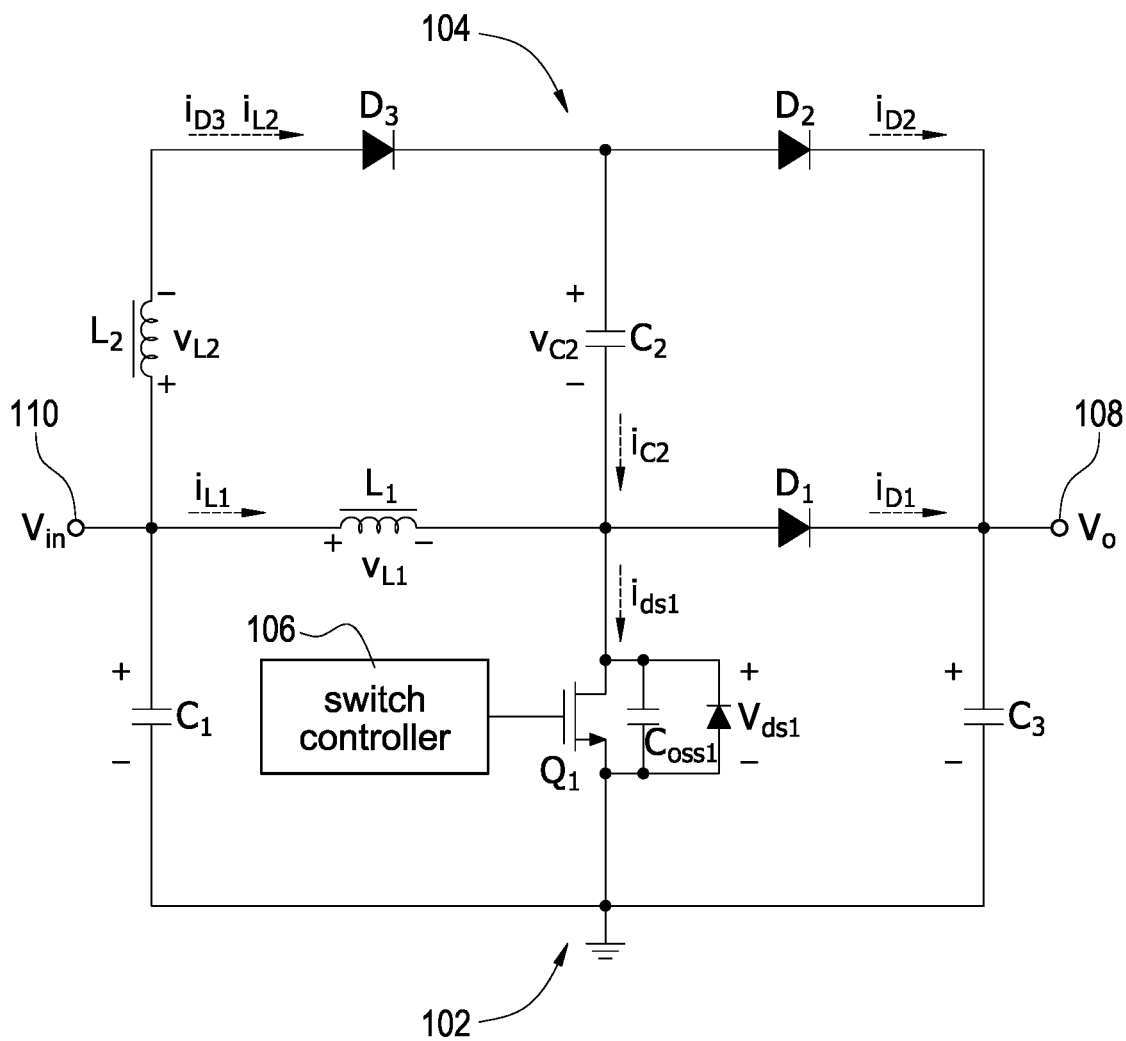
FIG. 7 shows a block diagram of another embodiment of the boost converting apparatus of the present disclosure.

Moreover, FIG. 7 shows a block diagram of another embodiment of the boost converting apparatus of the present disclosure, wherein the descriptions of the elements shown in FIG. 7 which are the same as the elements shown in FIG. 1 to FIG. 6 are not repeated here for brevity. One end of the resonant inductor $L_2$ is connected to an input end 110 directly, the other end of the resonant inductor $L_2$ is connected to an anode of the input-end unidirectional conduction component $D_3$ directly, and a cathode of the input-end unidirectional conduction component $D_3$ is connected to the output-end unidirectional conduction component $D_2$ and the resonant capacitor $C_2$ directly.

The advantage of the present disclosure is to use a snubber with a simple structure to reduce the switching loss of the boost converter and to reduce the electromagnetic interference. The present disclosure can absorb spikes after the switch of the boost converter is turned off and reduce the rising slope of the cross voltage of the switch to reduce the electromagnetic interference emission intensity caused by the high voltage slope, so as to reduce the switching loss when the switch is turned off (namely, the overlap area of the switch voltage and the switch current on the voltage and current waveforms). The input-end unidirectional conduction component $D_3$, the resonant inductor $L_2$, the resonant capacitor $C_2$ and the output-end unidirectional conduction component $D_2$ included in the passive lossless snubber 104 do not participate in the processing of the main power, nor are they in the power transmission path, so that the passive lossless snubber 104 only needs a very low component power rating; therefore, the present disclosure can reduce the component volume and the additional cost. According to the experimental data, under the same peripheral component parameters and full load efficiency, compared with the traditional RCD snubber, the present disclosure can reduce the switching loss by more than 1% and reduce the electromagnetic interference.

Although the present disclosure has been described with reference to the preferred embodiment thereof, it will be understood that the disclosure is not limited to the details thereof. Various substitutions and modifications have been suggested in the foregoing description, and others will occur to those of ordinary skill in the art. Therefore, all such substitutions and modifications are intended to be embraced within the scope of the disclosure as defined in the appended claims.

What is claimed is:

1. A boost converting apparatus comprising:
   a boost converter; and
   a passive lossless snubber electrically connected to the boost converter,
   wherein the passive lossless snubber comprises:
   an input-end unidirectional conduction component electrically connected to the boost converter;
   a resonant inductor electrically connected to the input-end unidirectional conduction component;
   a resonant capacitor electrically connected to the boost converter and the resonant inductor; and
   an output-end unidirectional conduction component electrically connected to the boost converter, the resonant inductor, and the resonant capacitor;
   wherein the boost converter comprises:
   a first inductor electrically connected to the input-end unidirectional conduction component and the resonant capacitor;
   a first transistor switch electrically connected to the first inductor and the resonant capacitor;
   a switch controller electrically connected to the first transistor switch; and
   a first diode electrically connected to the first transistor switch, the first inductor, the resonant capacitor, and the output-end unidirectional conduction component;

wherein when the boost converting apparatus is configured to work in a first working state, the switch controller is configured to turn on the first transistor switch, and the first inductor is configured to be excited by an input-end voltage to store an electric energy in a magnetic field form, and a first inductor current flowing through the first inductor increases gradually, and the resonant inductor and the resonant capacitor are configured to be charged by the input-end voltage and to resonate, and then the boost converting apparatus is configured to work in a second working state;

wherein when the boost converting apparatus is configured to work in the second working state, the switch controller is configured to keep turning on the first transistor switch, and the first inductor is configured to continue to be excited by the input-end voltage to store the electric energy in the magnetic field form, and the first inductor current flowing through the first inductor continues to increase, and the resonant inductor and the resonant capacitor are configured to continue to be charged by the input-end voltage and to resonate, and the input-end unidirectional conduction component is configured to make the resonant inductor and the resonant capacitor be configured to resonate for a half cycle and then stop resonating, so that a resonant capacitor voltage of the resonant capacitor is twice the input-end voltage, and so that a resonant inductor current flowing through the resonant inductor is zero, and then the boost converting apparatus is configured to work in a third working state.

2. The boost converting apparatus of claim 1, wherein when the boost converting apparatus is configured to work in the third working state, the switch controller is configured to turn off the first transistor switch, and a parasitic capacitor of the first transistor switch is configured to be charged by the first inductor current from zero volts, so that a drain-source voltage of the first transistor switch increases gradually, and the resonant capacitor is configured to discharge, so that the output-end unidirectional conduction component is configured to be forward-biased conducted, and the resonant capacitor voltage is discharged from twice the input-end voltage to zero volts, and the drain-source voltage of the first transistor switch plus the resonant capacitor voltage of the resonant capacitor is equal to an output-end voltage of an output end, and when the resonant capacitor voltage of the resonant capacitor is discharged to zero volts, the first diode is configured to be forward-biased conducted by the first inductor current, and then the boost converting apparatus is configured to work in a fourth working state.

3. The boost converting apparatus of claim 2, wherein when the boost converting apparatus is configured to work in the fourth working state, the switch controller is configured to keep turning off the first transistor switch, and the first diode is configured to continue to be forward-biased conducted by the first inductor current, and an input-end unidirectional conduction current flowing through the input-end unidirectional conduction component is zero, and the resonant inductor current flowing through the resonant inductor is zero, and a resonant capacitor current flowing through the resonant capacitor is zero, and an output-end unidirectional conduction current flowing through the output-end unidirectional conduction component is zero, and the electric energy stored in the magnetic field form by the first inductor is transmitted to the output end in a current form, and the first inductor current flowing through the first inductor decreases gradually.

4. The boost converting apparatus of claim 3, wherein the boost converter further comprises:
   an input-end capacitor electrically connected to the input-end unidirectional conduction component and the first inductor.

5. The boost converting apparatus of claim 4, wherein the boost converter further comprises:
   an output-end capacitor electrically connected to the output-end unidirectional conduction component and the first diode.

6. The boost converting apparatus of claim 5, wherein the input-end unidirectional conduction component is a diode; the output-end unidirectional conduction component is a diode.

7. The boost converting apparatus of claim 6, wherein the first transistor switch is a metal oxide semiconductor field effect transistor; the switch controller is a pulse width modulation signal controller.

* * * * *